US010914340B2

(12) United States Patent
Kikuchi (10) Patent No.: US 10,914,340 B2
(45) Date of Patent: Feb. 9, 2021

(54) INNER-RING RESTRAINT DEVICE OF HUB BEARING FOR VEHICLE

(71) Applicant: FUJI SHOJI CO., LTD., Hashima (JP)

(72) Inventor: Ko Kikuchi, Nagoya (JP)

(73) Assignee: FUJI SHOJI CO., LTD., Hashima (JP)

(*) Notice: Subject to any disclaimer, the term of this patent is extended or adjusted under 35 U.S.C. 154(b) by 0 days.

(21) Appl. No.: 16/496,278

(22) PCT Filed: Mar. 29, 2017

(86) PCT No.: PCT/JP2017/013113
§ 371 (c)(1),
(2) Date: Sep. 20, 2019

(87) PCT Pub. No.: WO2018/179192
PCT Pub. Date: Oct. 4, 2018

(65) Prior Publication Data
US 2020/0291991 A1    Sep. 17, 2020

(51) Int. Cl.
*F16C 19/18* (2006.01)
*B21J 9/02* (2006.01)
(Continued)

(52) U.S. Cl.
CPC ............. *F16C 19/186* (2013.01); *B21J 15/48* (2013.01); *B21K 25/00* (2013.01); *F16C 43/04* (2013.01);
(Continued)

(58) Field of Classification Search
CPC .. F16C 19/186; F16C 35/063; F16C 2326/02; F16C 2226/52; B21J 13/02; B21J 19/025;
(Continued)

(56) References Cited

U.S. PATENT DOCUMENTS 9,180,639 B2 *  11/2015  Ferrero ................. B21K 21/12
10,391,542 B2 *  8/2019  Hagiwara ............... B60B 27/00
(Continued)

FOREIGN PATENT DOCUMENTS

CN        2936598 Y  *  8/2007
CN     201172157 Y  *  12/2008
(Continued)

OTHER PUBLICATIONS

International Search Report dated Jun. 27, 2017 in PCT/JP2017/013113 fled Mar. 29, 2017.

*Primary Examiner* — Marcus Charles
(74) *Attorney, Agent, or Firm* — Oblon, McClelland, Maier & Neustadt, L.L.P.

(57) ABSTRACT

An inner-ring restraint device of a hub bearing capable of restraining an inner ring efficiently without applying a load to the hub bearing. An inner-ring restraint device includes a restraint ring allowing a plurality of pieces to be arranged to form a ring shape and restricting an inner ring of a hub bearing by reducing a diameter, a support plate having a ring shape coaxial with the hub bearing, being provided so as to move in an axial direction and supporting the restraint ring at a position closer to the hub bearing for the vehicle than the restraint ring in the axial direction and a ring-shaped operation plate connected to the support plate so as to relatively move in the axial direction and applying a pressure in a direction of reducing the diameter to the restraint ring by coming relatively close to the support plate.

5 Claims, 11 Drawing Sheets

(51) Int. Cl.
*B60B 27/00* (2006.01)
*F16C 35/06* (2006.01)
*B21J 15/48* (2006.01)
*F16C 43/04* (2006.01)
*B21K 25/00* (2006.01)
*F16C 35/063* (2006.01)

(52) U.S. Cl.
CPC ........... *B21J 9/025* (2013.01); *B60B 27/0084* (2013.01); *B60B 2310/3142* (2013.01); *F16C 35/063* (2013.01); *F16C 2326/02* (2013.01)

(58) Field of Classification Search
CPC .. B21J 15/12; B21J 15/48; B21J 9/025; B60B 27/084; B60B 2310/3142; B21K 25/00
USPC ................. 384/504, 544, 559, 569, 589; 29/898.062, 898.07, 725, 898.09
See application file for complete search history.

(56) References Cited

U.S. PATENT DOCUMENTS

| | | | | |
|---|---|---|---|---|
| 10,557,505 | B2 * | 2/2020 | Hagiwara | B21J 9/025 |
| 2002/0126929 | A1 * | 9/2002 | Ozawa | F16C 19/187 |
| | | | | 384/544 |
| 2006/0002644 | A1 * | 1/2006 | Mitsue | B23B 5/02 |
| | | | | 384/448 |
| 2007/0116397 | A1 * | 5/2007 | Pauskar | F16C 43/04 |
| | | | | 384/544 |
| 2007/0217728 | A1 | 9/2007 | Kashiwagi et al. | |
| 2010/0146790 | A1 * | 6/2010 | Gingrich | F16C 43/04 |
| | | | | 29/898 |
| 2011/0061238 | A1 * | 3/2011 | Sera | F16C 43/04 |
| | | | | 29/898.04 |
| 2014/0100044 | A1 * | 4/2014 | Kimura | F16D 3/223 |
| | | | | 464/109 |
| 2016/0263940 | A1 * | 9/2016 | Hagiwara | B60B 27/00 |

FOREIGN PATENT DOCUMENTS

| | | | | | |
|---|---|---|---|---|---|
| CN | 103003147 | A | * | 3/2013 | ............. B25B 27/06 |
| CN | 205148221 | U | * | 4/2016 | |
| CN | 205657380 | U | * | 10/2016 | |
| CN | 205745014 | U | * | 11/2016 | |
| JP | 2006-132711 | A | | 5/2006 | |
| JP | 2006-153053 | A | | 6/2006 | |
| JP | 2008-132575 | A | | 6/2006 | |
| JP | 5472697 | B2 | | 4/2014 | |
| WO | WO-2004002660 | A1 | * | 1/2004 | ............... B23B 5/02 |

* cited by examiner

INNER-RING RESTRAINT DEVICE OF HUB BEARING FOR VEHICLE

CROSS-REFERENCE TO RELATED APPLICATIONS

This application is a United States national stage application of International Application No. PCT/JP2017/013113, filed Mar. 29, 2017, which designates the United States, and the entire content the above application is hereby incorporated herein by reference in entirety.

TECHNICAL FIELD

The present invention relates to an inner-ring restraint device restraining an inner ring of a hub bearing for a vehicle at the time of manufacturing the hub bearing for the vehicle.

BACKGROUND ART

There exists a hub bearing used for a car and the like that includes a shaft body, an inner ring provided on an outer periphery of the shaft body and an outer ring provided on an outer periphery of the inner ring so as to rotate freely by a plurality of rolling elements. In this type of hub bearing, the inner ring is fixed so as not to slip off by caulking an end portion of the shaft body after the inner ring is fitted to the outer periphery of the shaft body.

The outer periphery of the inner ring is restrained when caulking the end portion of the shaft body at the time of manufacture. Accordingly, deformation of the inner ring due to stress of caulking is prevented in the hub bearing (for example, refer to Patent Literature 1).

In Patent Literature 1, divided rings allowed to abut on the outer periphery of the inner ring of the hub bearing and a connecting plate connecting respective pieces of the divided rings in a ring shape are included. There is disclosed a caulking auxiliary tool having a base plate provided in outer peripheries of the divided rings and the connecting plate and pressurized in an axial direction of the shaft body of the hub bearing to apply pressure toward the center to the divided rings.

CITATION LIST

Patent Literature

Patent Literature 1: Japanese Patent No. 5472697

SUMMARY OF INVENTION

Technical Problem

However, in the related-art technique described in Patent Literature 1, the base plate is pressurized in a state where the divided rings are allowed to abut on the inner ring and the outer ring of the hub bearing in the axial direction when the base plate is pressurized. Accordingly, friction occurs between respective pieces of the divided rings moving toward the center in a radial direction and the inner ring or the outer ring of the hub bearing. When friction occurs, movement of the respective pieces of the divided rings toward the center is hindered. Therefore, high pressurization to the base plate is necessary for restraining the inner ring of the hub bearing by the divided rings in the related-art technique. There is thus a problem that a large load is applied in the axial direction to the inner ring or the outer ring of the hub bearing.

Accordingly, the present invention has been made to provide an inner-ring restraint device of a hub bearing for a vehicle capable of restraining the outer periphery of the inner ring without applying a load in the axial direction to the inner ring and the outer ring of the hub bearing.

Solution to Problem

An inner-ring restraint device of a hub bearing for a vehicle according to the present invention is an inner-ring restraint device restricting an inner ring at the time of manufacturing the hub bearing for the vehicle having a shaft body, the inner ring provided on an outer periphery of the shaft body and an outer ring provided on an outer periphery of the inner ring so as to rotate freely by a plurality of rolling elements, which includes a restraint ring having a ring shape formed by allowing a plurality of pieces to be arranged to form a ring shape coaxial with the shaft body and restricting an outer peripheral portion of the inner ring by reducing a diameter, the restraint ring restricting an outer peripheral portion of the inner ring of the hub bearing by reducing a diameter, and each of the plurality of pieces has an arc-shaped portion that restricts the outer peripheral portion of the inner ring of the hub bearing; a support plate having a ring shape coaxial with the shaft body, being provided so as to move along an axial direction of the shaft body and supporting the plural pieces so as to respectively move in a state where the plural pieces are arranged in the ring shape so as to reduce and expand the diameter of the restraint ring at a position closer to the hub bearing for the vehicle than the restraint ring in the axial direction and a ring-shaped operation plate arranged on an outer periphery of the restraint ring, being connected to the support plate so as to relatively move in the axial direction and applying a pressure in a direction of reducing the diameter to the plural pieces of the restraint ring respectively by coming relatively close to the support plate.

In the inner-ring restraint device of the hub bearing for the vehicle according to the invention, the plural pieces of the restraint ring are supported by the support plate arranged closer to the hub bearing for the vehicle than the restraint ring. Accordingly, the plural pieces of the restraint ring do not abut on the inner ring or the outer ring of the hub bearing for the vehicle in the axial direction of the hub bearing for the vehicle at the time of restraining the inner ring of the hub bearing for the vehicle. Therefore, friction does not occur between the plural pieces of the restraint ring and the inner ring or the outer ring of the hub bearing for the vehicle in the present invention. Accordingly, the outer periphery of the inner ring can be efficiently restrained without applying the load in the axial direction to the inner ring or the outer ring of the hub bearing for the vehicle in the present invention.

DESCRIPTION OF EMBODIMENTS

1. First Embodiment

<1-1. Structure of Hub Bearing 1 for Vehicle>

Figure 1:
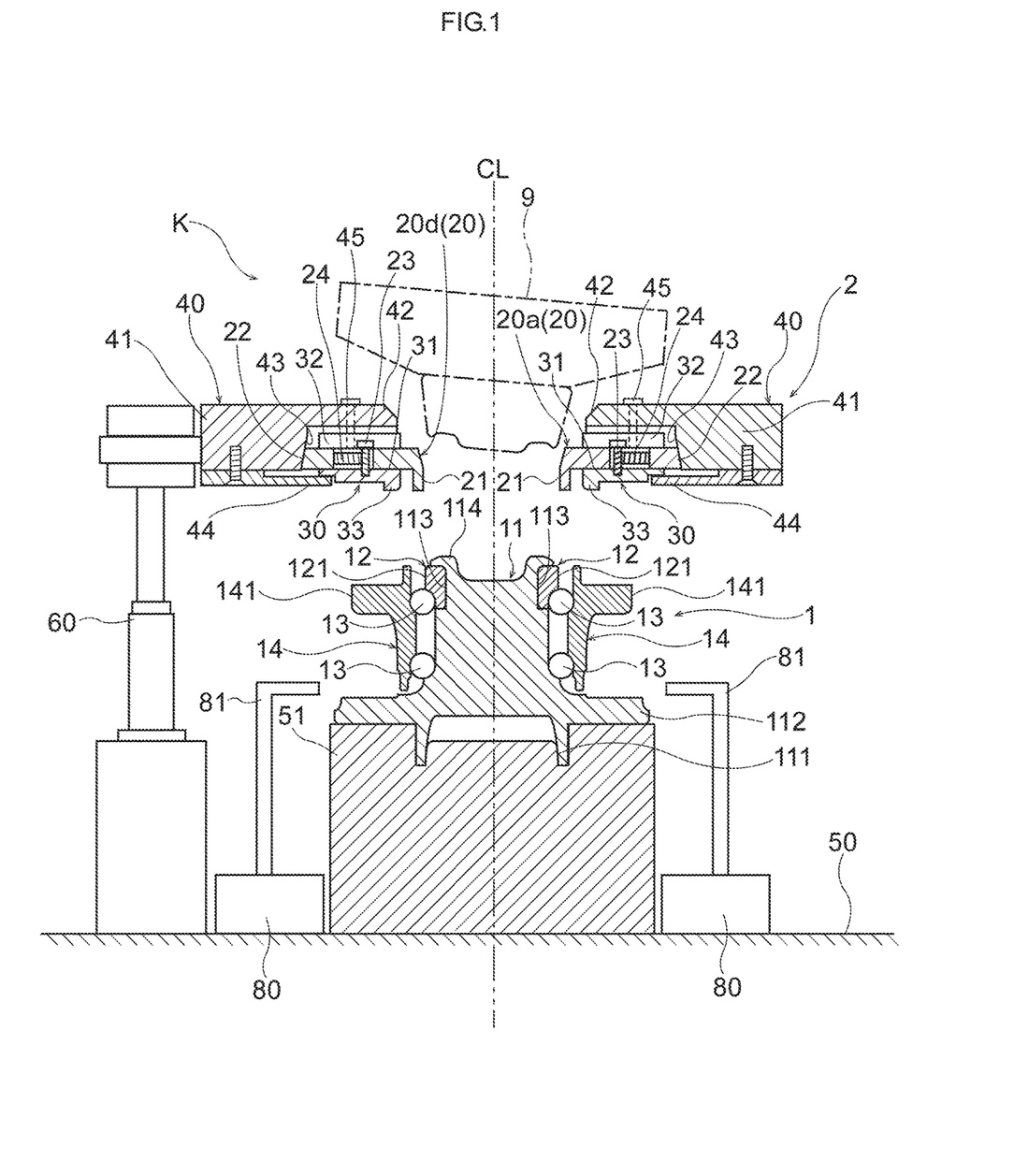
FIG. 1 is a cross-sectional view showing a non-restrained state on a vertical cross section of an inner-ring restraint device and a hub bearing according to a first embodiment of the present invention.
Figure 2:
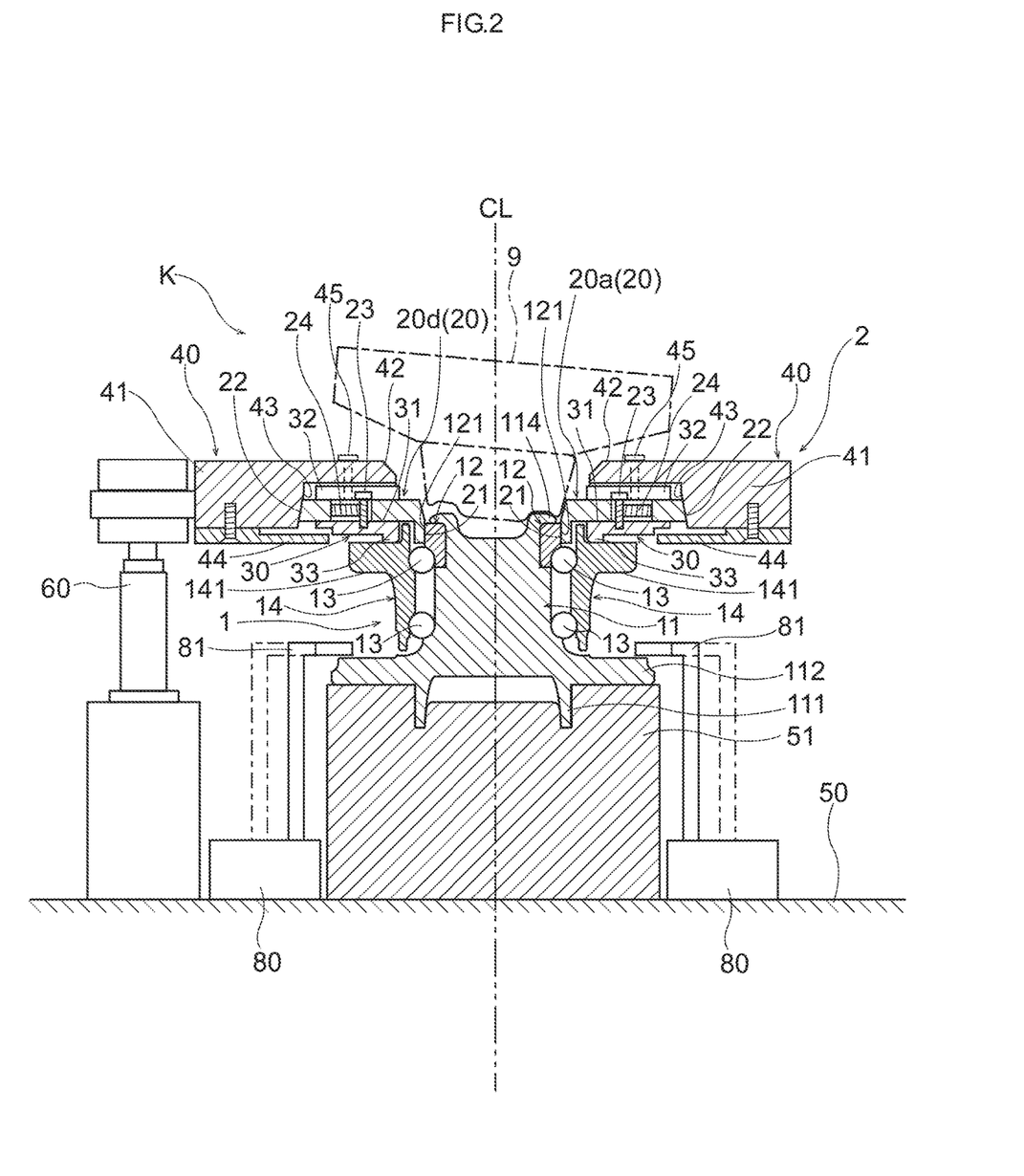
FIG. 2 is a cross-sectional view showing a restrained state corresponding to FIG. 1.

Hereinafter, a first embodiment of the present invention will be explained with reference to FIG. 1 to FIG. 6. A hub bearing 1 for a vehicle supports, for example, a wheel of a car with respect to a suspension on a vehicle body side so as to rotate freely. As shown in FIG. 1 and FIG. 2, the hub bearing 1 includes a shaft body 11, an inner ring 12 provided on an outer periphery of the shaft body 11 and an outer ring 14 provided on an outer periphery of the inner ring 12 so as to rotate freely by a plurality of rolling elements 13. The hub bearing 1 functions as, for example, an angular contact ball bearing, which is configured so that the outer ring 14 can relatively rotate with respect to the shaft body 11 and the inner ring 12.

The shaft body 11 has a columnar shape or a cylindrical shape. The shaft body 11 includes a boss portion 111 provided in a cylindrical shape and a connection flange 112 with a large diameter at one end portion (on a lower side in the drawing) in an axial direction. The connection flange 112 connects the shaft body 11 to a wheel or a brake rotor which is not shown.

The shaft body 11 is provided with a small-diameter portion 113 at the other end portion (on an upper side in the drawing). The inner ring 12 is fitted to the small-diameter portion 113 so as to closely contact an outer periphery thereof. The shaft body 11 also includes a caulking portion 114 to which caulking is performed for preventing slipping-off of the inner ring 12 at an end edge of the other end portion. The caulking portion 114 is caulked so that the end edge of the other end portion formed in the cylindrical shape is widened to an outer side in a radial direction.

The shaft body 11 has a bearing ring in a circumferential direction at a position of an outer periphery close to the connection flange 112, and a plurality of rolling elements 13 are arranged along the bearing ring in the circumferential direction. The inner ring 12 has a bearing ring in the circumferential direction on an outer periphery of one end portion in the axial direction, and a plurality of rolling elements 13 are arranged in the circumferential direction along the bearing ring. Then, the outer ring 14 is provided so as to rotate in the shaft body 11 and the inner ring 12 through the plurality of rolling elements 13.

The outer ring 14 has a cylindrical shape. The outer ring 14 is provided so as to cover the outer periphery of the inner ring 12 and to surround the outer periphery of the shaft body 11 in a range from the other end portion of the shaft body 11 to approximately the front of the connection flange 112. The outer ring 14 has an attachment flange 141 provided in a large diameter at the other end portion on the inner ring 12 side. The attachment flange 141 is for attaching the hub bearing 1 to the suspension on the vehicle body side.

The outer ring 14 has a bearing ring in the circumferential direction on an inner periphery of one end portion in the axial direction, and the plurality of rolling elements 13 on the outer periphery of the bearing body 11 are engaged with the bearing ring so as to rotate. The outer ring 14 also has a bearing ring in the circumferential direction on an inner periphery in the other end portion thereof, and the plurality of rolling elements 13 provided on the outer periphery of the inner ring 12 are engaged with the bearing ring so as to rotate.

<1-2. Structure of Caulking Device K>

Next, a structure of a caulking device K performing caulking of the caulking portion 114 in the hub bearing 1 will be explained. The caulking device K includes a placing table 51 on which the hub bearing 1 is placed above a base 50. The hub bearing 1 is placed in a vertical direction on the placing table 51. In this case, the boss portion 111 of the hub bearing 1 is fitted to a circular concave portion provided in the center on an upper surface of the placing table 51. The placing table 51 supports the hub bearing 1 in a stable posture in a state where the connection flange 112 of the hub bearing 1 is placed on the upper surface around the concave portion.

The caulking device K has holding mechanisms 80 for preventing the hub bearing 1 from floating above the placing table 51 at positions on right and left both sides of the placing table 51 above the base 50. The holding mechanisms 80 include holding arms 81 protruding above the connection flange 112 of the hub bearing 1 and holding the hub bearing 1. The holding mechanisms 80 activate the holding arms 81 so as to advance and retreat in a non-holding position (see FIG. 1) and a holding position (see solid lines in FIG. 2) by, for example, an air cylinder or the like. Arm tip ends of the holding arms 81 protrude above the connection flange 112 of the hub bearing 1 in the holding position to thereby prevent floating of the hub bearing 1.

The caulking device K has a caulking tool 9 at a position above the hub bearing 1 placed on the placing table 51. The caulking tool 9 is configured to perform caulking by a rolling caulking method. The caulking tool 9 is arranged coaxially with a central axis CL of the shaft body 11 of the hub bearing 1 and can move upward and downward in the axial direction along the central axis CL.

<1-3. Structure of Inner-Ring Restraint Device 2>

Figure 3:
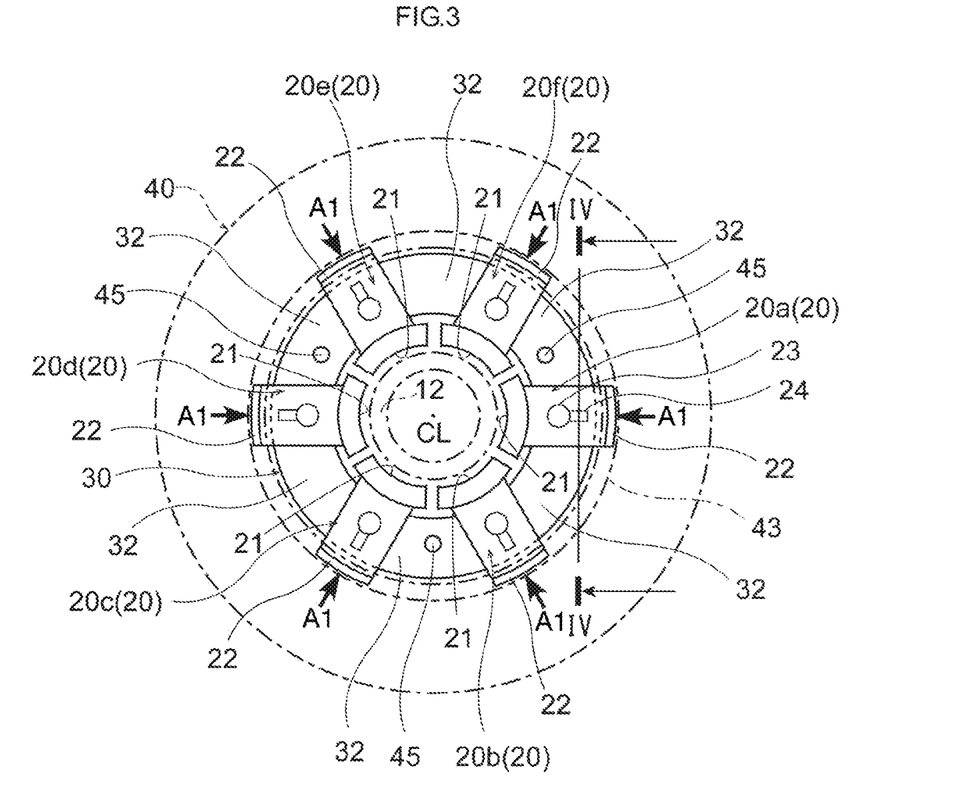
FIG. 3 is a schematic plan view showing a restraint ring and a support plate of the inner-ring restraint device according to the first embodiment.
Figure 4:
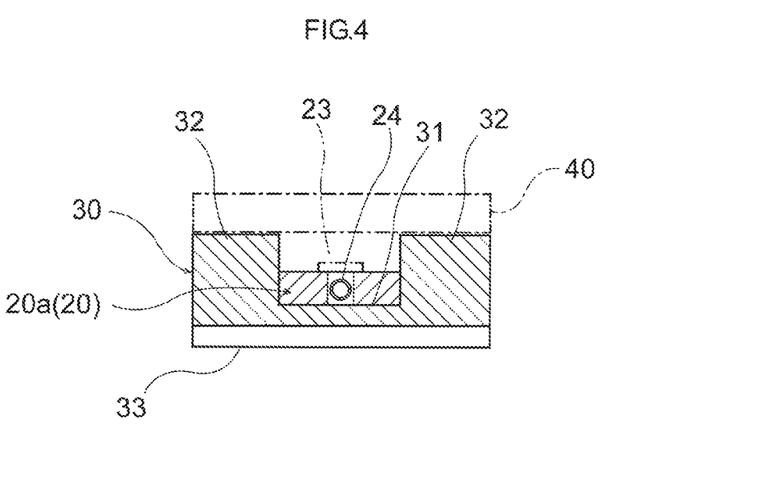
FIG. 4 is a cross-sectional view at a position taken along IV-IV line of FIG. 3.

The caulking device K has an inner ring restraint device 2 between the caulking tool 9 and the hub bearing 1 at a position below the caulking tool 9. Hereinafter, the inner-ring restraint device 2 will be explained with reference to FIG. 1 to FIG. 4. As shown in FIG. 1 to FIG. 3, the inner-ring restraint device 2 is a device restraining an outer peripheral portion 121 of the inner ring 12 of the hub bearing 1 at the time of performing caulking of the caulking portion 114 in the shaft body 11 of the hub bearing 1. The inner-ring restraint device 2 has a ring shape as a whole, which is provided coaxially with the central axis CL of the hub bearing 1 placed on the placing table 51. The inner-ring restraint device 2 can be elevated and lowered along the axial direction of the central axis CL by an elevating device 60 using a hydraulic cylinder mechanism or the like.

The inner-ring restraint device 2 includes a restraint ring 20 capable of reducing and expanding a diameter and restraining the outer peripheral portion 121 of the inner ring 12 of the hub bearing 1 by reducing the diameter, a support plate 30 supporting the restraint ring 20 and an operation plate 40 operating the restraint ring 20 in a direction of reducing the diameter (arrow A1 direction in FIG. 3). The restraint ring 20, the support plate 30 and the operation plate 40 make a ring shape, which are assembled so as to be coaxial with the central axis CL of the hub bearing 1.

The restraint ring 20 is formed by the combination of a plurality of pieces 20a, 20b, 20c, 20d, 20e and 20f divided (into six in the example of the drawing) in the circumferential direction. The plurality of pieces 20a, 20b, 20c, 20d, 20e and 20f have the same structure, and the structure will be explained with a focus on the piece 20a. The piece 20a is formed of an approximately rectangular plate member having an arc-shaped inner periphery. The piece 20a has an abutting portion 21 abutting on the outer peripheral portion 121 of the inner ring 12 of the hub bearing 1 by the arc-shaped inner periphery. The abutting portion 21 has an arc shape extending along the outer peripheral portion 121 of the inner ring 12 in plan view. The abutting portion 21 also protrudes downward from the plate member. The abutting portion 21 forms a vertical surface corresponding to the outer peripheral portion 121 of the inner ring 12 so as to abut on the outer peripheral portion 12 of the inner ring 12 along the circumferential direction.

The piece 20a has an outer-periphery inclined surface 22 on an end surface of the outer peripheral side. The outer-periphery inclined surface 22 forms an inclined surface having a shape in which an outer peripheral end edge on a lower side is positioned on an outer side with respect to an outer peripheral end edge on an upper surface of the plate member. For example, the outer-periphery inclined surface 22 of the piece 20a has an inclined surface extending right downward in FIG. 1 and FIG. 2. The outer-periphery inclined surface 22 of the piece 20d has an inclined surface extending left downward. The outer-periphery inclined surface 22 of the piece 20a has an inclined angle of approximately 10 degrees with respect to the vertical direction.

The support plate 30 is provided at a position closer to the hub bearing 1 side than the restraint ring 20. The support plate 30 has a structure supporting the plural respective pieces 20a, 20b, 20c, 20d, 20e and 20f from a lower side. The support plate 30 includes a plurality of support surfaces 31 corresponding to the plural respective pieces 20a, 20b, 20c, 20d, 20e and 20f. The support surface 31 is formed by a groove bottom of a groove portion surrounded by thick partition portions 32 of the support plate 30 (see FIG. 4). Respective support surfaces 31 are formed in a flat surface shape approximately orthogonal to the central axis CL radially from the central axis CL (see FIG. 3).

As described above, the support plate 30 allows the respective pieces 20a, 20b, 20c, 20d, 20e and 20f to be arranged in a ring shape respectively by the plural support surfaces 31 in the radial state to thereby form the restraint ring 20. The support plate 30 also allows the support surfaces 31 to abut on lower surfaces of the respective pieces 20a, 20b, 20c, 20d, 20e and 20f to thereby support the respective pieces 20a, 20b, 20c, 20d, 20e and 20f to move respectively in the radial direction orthogonal to the central axis CL. Accordingly, the support plate 30 supports the restraint ring 20 so as to reduce and expand the diameter.

The support plate 30 connects the respective support surfaces 31 to the respective pieces 20a, 20b, 20c, 20d, 20e and 20f by guide pins 23 so as to prevent floating and slipping-off of the pieces 20a, 20b, 20c, 20d, 20e and 20f. For example, the piece 20a is provided with a through guide hole in an upper and lower direction at approximately the center thereof. The through guide hole is a long hole extending along a moving direction of the piece 20a. Then, the guide pin 23 is allowed to pierce through the through guide hole from above and a piercing end of the guide pin 23 is fastened to the support surface 31 of the support plate 30 to thereby prevent slipping off. Moreover, biasing members 24 biasing the restraint ring 20 in a direction expanding the diameter are provided in the through guide holes of the respective pieces 20a, 20b, 20c, 20d, 20e and 20f.

The support plate 30 includes a thick protruding portion 33 protruding downward on a lower surface of an inner periphery. The protruding portion 33 is a regulating portion for regulating lowering of the support plate 30 by allowing the protruding portion 33 to abut on an upper surface of the attachment flange 141 of the outer ring 14 of the hub bearing 1 when the inner ring restraint device 2 is lowered with the support plate 30 toward the hub bearing 1.

The operation plate 40 is provided on outer peripheries of the restraint ring 20 and the support plate 30. The operation plate 40 includes a main body portion 41 positioned on the outer peripheries of the restraint ring 20 and the support plate 30. The operation plate 40 also has a thick inner-side portion 42 protruding from an upper part of an inner periphery of the main body portion 41 to the direction of the central axis CL to cover the restraint ring 20 and the support plate 30 from above. The operation plate 40 further includes an inner-periphery tapered surface 43 corresponding to the outer-periphery inclined surfaces 22 of the respective pieces 20a, 20b, 20c, 20d, 20e and 20f of the restraint ring 20 on an inner peripheral surface of the main body portion 41. The inner-periphery tapered surface 43 is formed in an inclined shape in which a lower inner peripheral diameter is gradually expanded than an upper inner peripheral diameter of the main body portion 41. The inner-periphery tapered surface 43 has an inclined angle of approximately 10 degrees with respect to the vertical direction in the same manner as the outer-periphery inclined surfaces 22.

The operation plate 40 is connected to the support plate 30 so as to relatively move along the axial direction of the central axis CL in the state where the restraint ring 20 and the support plate 30 are arranged on the inner peripheral side of the main body portion 41. For example, the operation plate 40 performs connection by allowing a plurality of connecting pins 45 protruding downward in the inner-side portion 42 to pierce through the partition portions 32 of the support plate 30 so as to move.

The operation plate 40 also has a stopper 44 on a lower surface of the main body portion 41 so as to regulate a lower limit of a lowering of the support plate 30 with respect to the operation plate 40. The stopper 44 has a ring shape and is fastened to the lower surface of the main body portion 41 of the operation plate 40. An inner peripheral portion of the stopper 44 is formed to have a smaller diameter than the inner periphery of the main body portion 41 of the operation plate 40. The inner peripheral portion of the stopper 44 abuts on the outer periphery of the lower surface of the support plate 30 to thereby regulate lowering of the support plate 30.

As the support plate 30 is connected to the operation plate 40, the outer-periphery inclined surfaces 22 of the respective pieces 20a, 20b, 20c, 20d, 20e and 20f of the restraint ring 20 constantly abut on the inner-periphery tapered surface 43 of the main body portion 41 of the operation plate 40.

<1-4. Restraining Operation of Inner-Ring Restraint Device 2>

Figure 5:
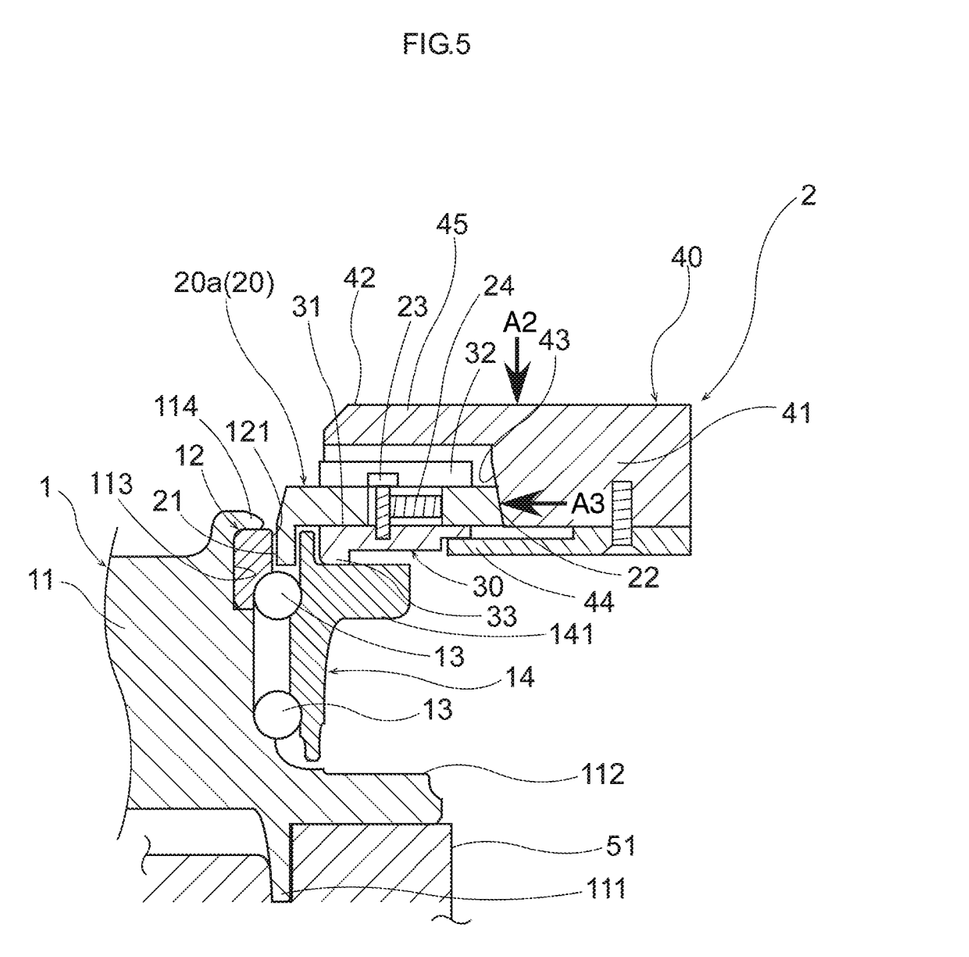
FIG. 5 is a cross-sectional view of a relevant part showing a process of restraining an inner ring of the hub bearing by the inner-ring restraint device corresponding to FIG. 2.
Figure 6:
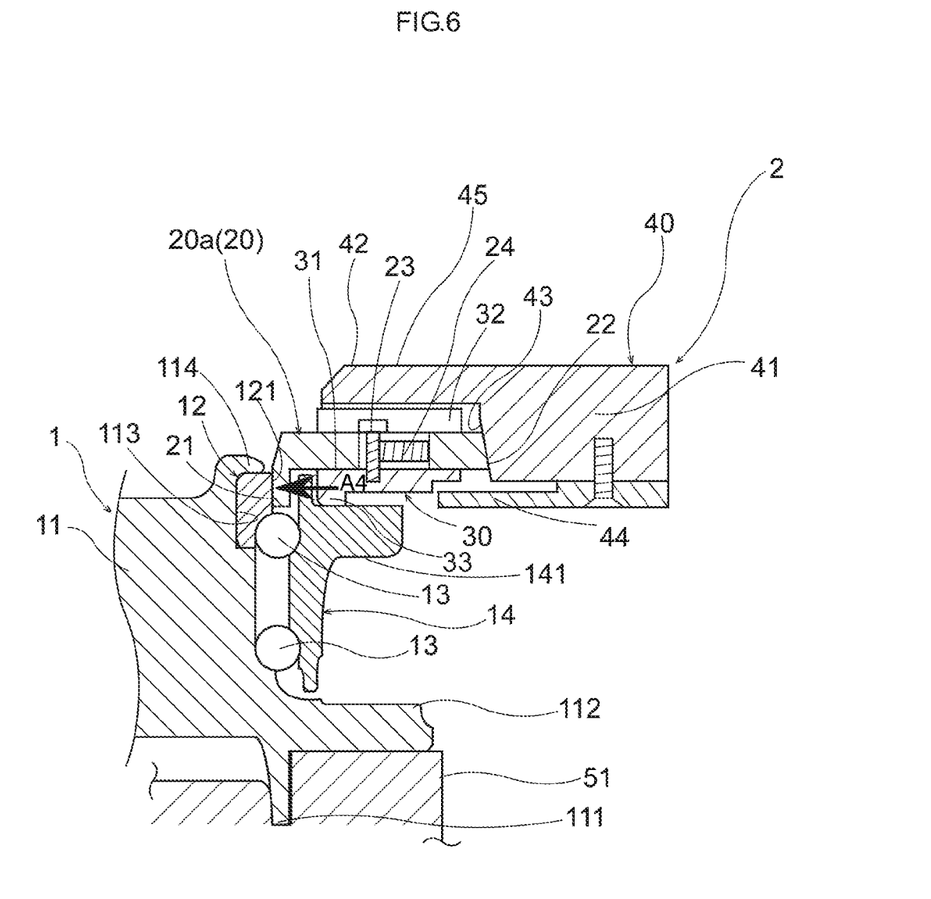
FIG. 6 is a cross-sectional view of a relevant part showing a state where the inner ring is restrained corresponding to FIG. 4.

Referring to FIG. 5 and FIG. 6, a restraining operation of the inner ring 12 of the hub bearing 1 by the inner-ring restraint device 2 will be explained. First, the inner-ring restraint device 2 is lowered toward the hub bearing 1 by the elevating device 60 (FIG. 1). In this case, the operation plate 40 of the inner-ring restraint device 2 is pulled down by the elevating device 60, and the support plate 30 and the restraint ring 20 are lowered integrally with the operation plate 40 (arrow A2 direction in FIG. 5).

When the inner-ring restraint device 2 is lowered, the protruding portion 33 on the lower surface of the support plate 30 abuts on the attachment flange 141 of the outer ring 14 of the hub bearing 1 as shown in FIG. 5. Accordingly, the lowering of the support plate 30 is regulated. At this time, the abutting portion 21 on the inner periphery of the restraint ring 20 faces the outer peripheral portion 121 of the inner ring 12 of the hub bearing 1.

Even when the lowering of the support plate 30 is regulated, the lowering of the operation plate 40 is continued. When the operation plate 40 is further lowered, the operation plate 40 is displaced downward with respect to the restraint ring 20 and the support plate 30, and the inner-side portion 42 moves relatively so as to come close to the support plate 30 along the axial direction. According to the relative movement, the inner-periphery tapered surface 43 of the operation plate 40 pushes the respective pieces 20a, 20b, 20c, 20d, 20e and 20f of the restraint ring 20 supported by the support plate 30 toward the inner side (arrow A3 direction in FIG. 5). Then, the respective pieces 20a, 20b, 20c, 20d, 20e and 20f are displaced inward in the radial direction orthogonal to the central axis CL (see FIG. 1 to FIG. 3) (for example, a displacement amount is approximately 1 to 2 mm), and the restraint ring 20 is reduced in diameter.

Then, the abutting portion 21 on the inner periphery of the restraint ring 20 with the reduced diameter abuts on the outer peripheral portion 121 of the inner ring 12 of the hub bearing 1 and is pushed thereto as shown in FIG. 6 (arrow A4 direction in FIG. 6). Next, a pressure toward the central axis CL is applied from the operation plate 40 to the restraint ring 20, and the outer peripheral portion 121 of the inner ring 12 is restrained by the restraint ring 20.

After the inner ring 12 is restrained, the end edge (the caulking portion 114) at the other end portion of the shaft body 11 in the hub bearing 1 is caulked. After the processing, the inner-ring restraint device 2 is elevated to release the restraint. At this time, the holding mechanisms 80 operate and tip ends of the holding arms 81 protrude above the connection flange 112 of the hub bearing 1 to thereby prevent floating of the hub bearing 1 caused by elevation of the inner-ring restraint device 2 (see FIG. 2).

2. Second Embodiment

A second embodiment of the present invention will be explained with reference to FIG. 7 to FIG. 12. A basis structure of the embodiment is approximately the same as that of the first embodiment, and different points will be mainly explained. In the drawings, the same symbols are given to the same members, and explanation of the same members is omitted.

<2-1. Structure of Caulking Device K1>

Figure 7:
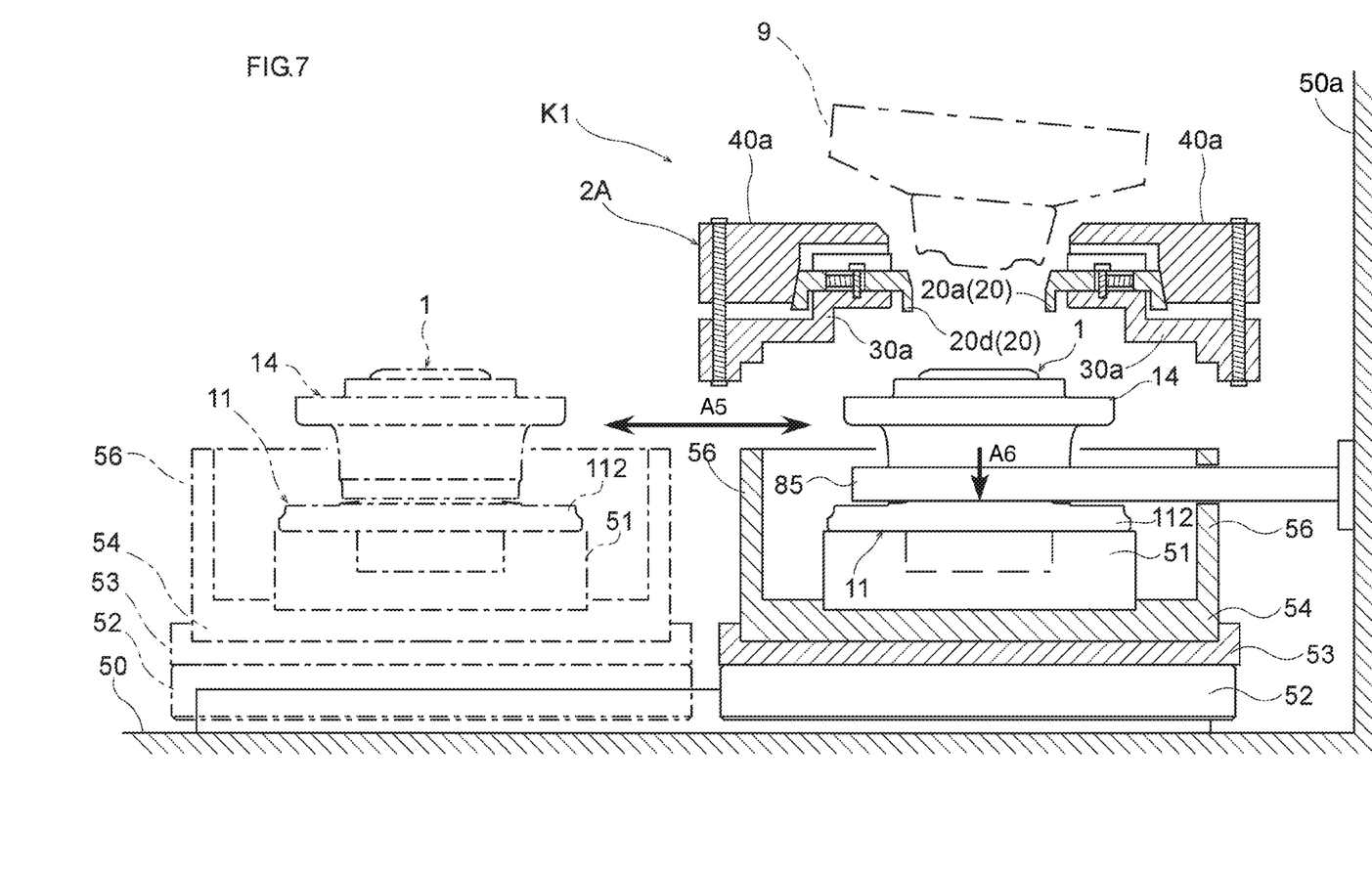
FIG. 7 is a schematic side view of a cross section showing part of a caulking device including an inner-ring restraint device according to a second embodiment of the present invention.
Figure 8:
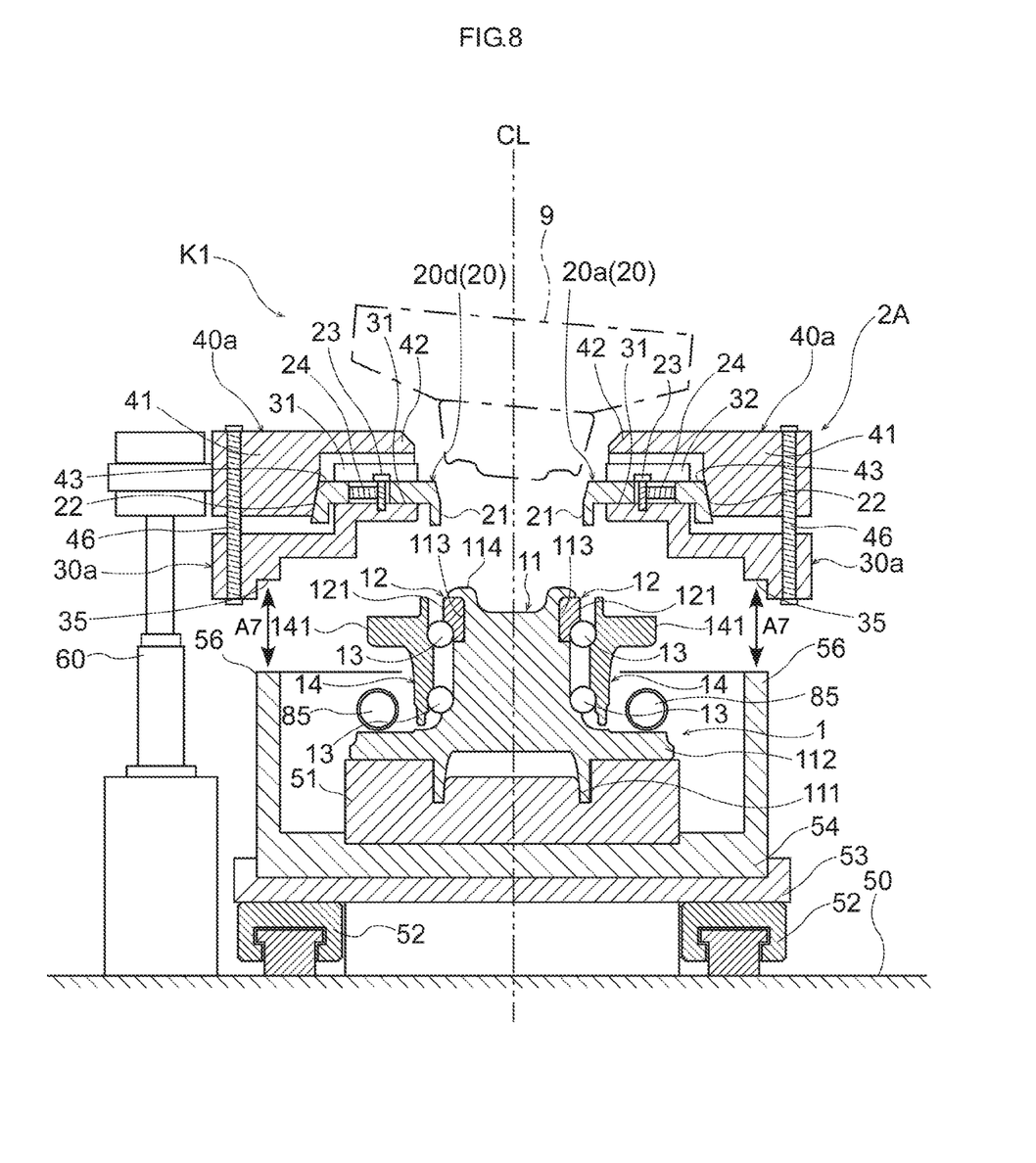
FIG. 8 is a cross-sectional view showing a non-restrained state on a vertical cross section of the inner-ring restraint device and a hub bearing according to the second embodiment.
Figure 9:
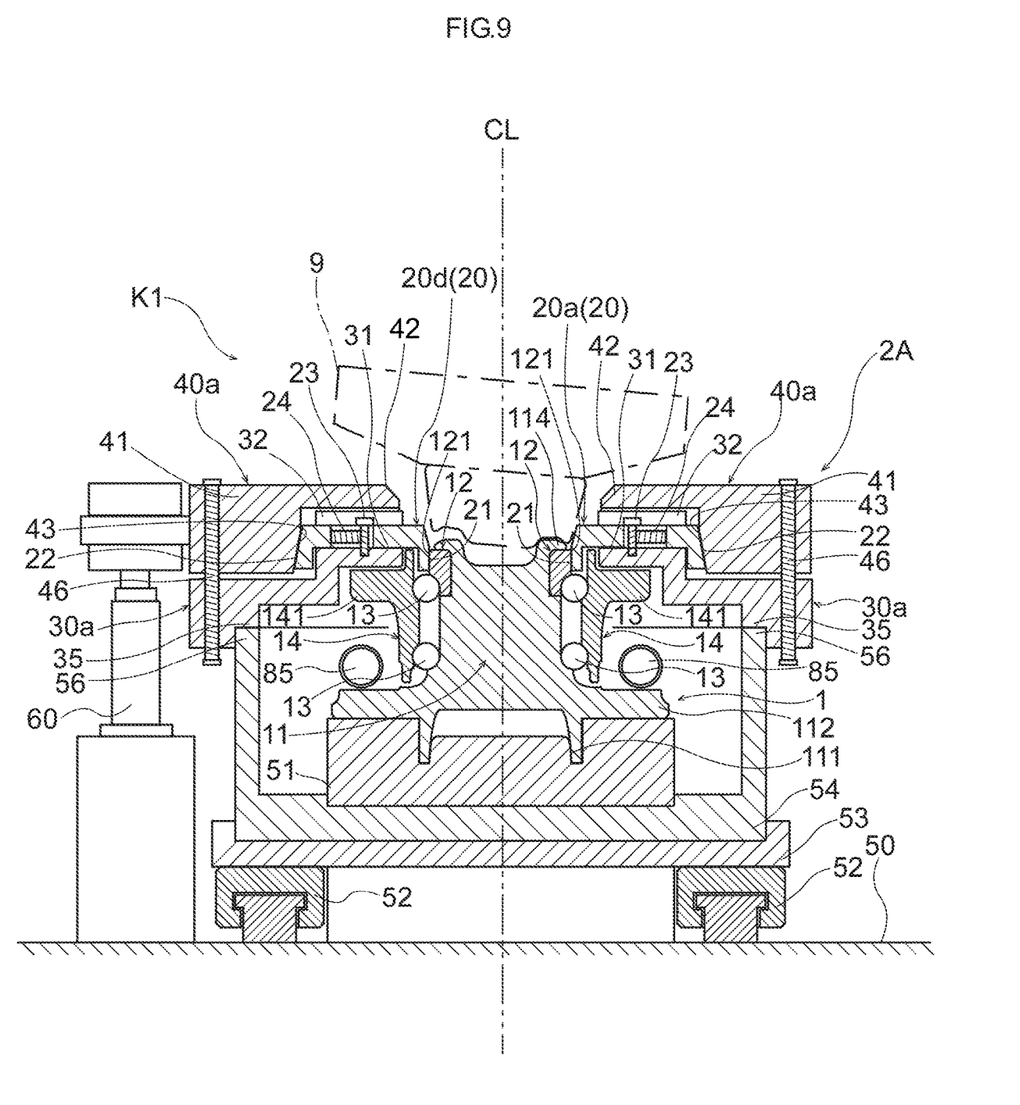
FIG. 9 is a cross-sectional view showing a restrained state corresponding to FIG. 8.

The caulking device K1 has a structure in which a position where the hub bearing 1 is attached/detached to/from the device and a position where caulking is performed differ, and the device is moved there between as shown in FIG. 7 (arrow A5 direction in FIG. 7). The calking device K1 includes a right and left pair of slide rails 52 on the base 50 as shown in FIG. 7 to FIG. 9. Each slide rail 52 includes a lower rail and an upper rail which can slidably move with respect to the lower rail. The both slide rails 52 support a moving table 53 installed on the upper rails so as to move. The placing table 51 on which the hub bearing 1 is placed is installed on the moving table 53 through a base plate 54.

The base plate 54 is formed in a circular plate body which is coaxial with the central axis CL of the hub bearing 1 placed on the placing table 51. A cylindrical portion 56 standing upward from an outer peripheral edge of the base plate 54 is integrally formed with the base plate 54. The cylindrical portion 56 functions as a regulating portion that regulates lowering of a support plate 30a by allowing an upper end edge to abut on the support plate 30a of an inner-ring restraint device 2A which is lowered when the inner-ring restraint device 2A is lowered.

The caulking device K1 has a right and left pair of holding tools 85 extending from a wall surface 50a on the back of the device in parallel to the slide rail 52 at a position where caulking is performed to the hub bearing 1. The holding tools 85 are formed of a round bar or a round pipe, protruding above the connection flange 112 of the shaft body 11 of the hub bearing 1 to thereby prevent floating of the hub bearing 1 (arrow A6 direction in FIG. 7).

<2-2. Structure of Inner-Ring Restraint Device 2A>

Figure 10:
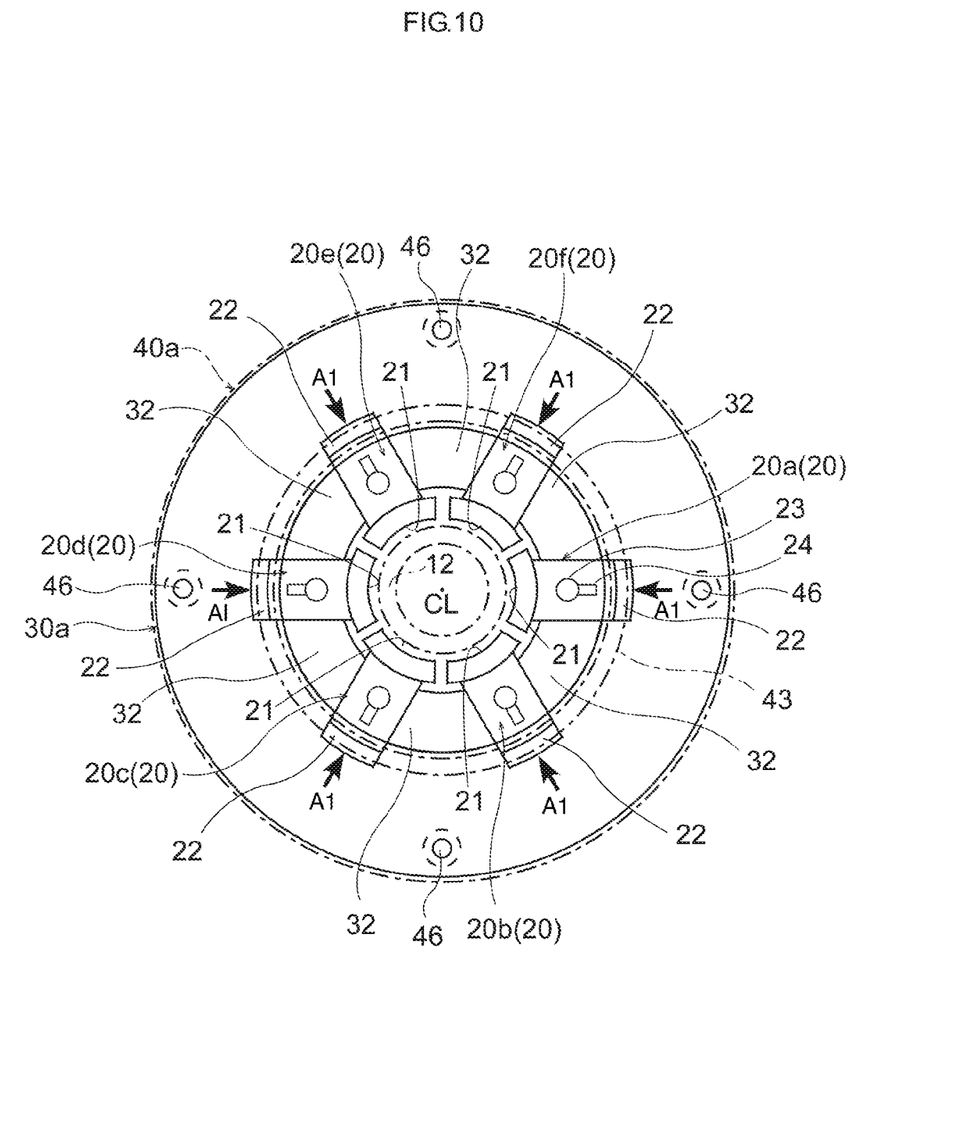
FIG. 10 is a schematic plan view showing a restraint ring and a support plate of the inner-ring restraint device according to the second embodiment.

As shown in FIG. 8 to FIG. 10, the inner-ring restraint device 2A includes the restraint ring 20, the support plate 30a supporting the restraint ring 20 and an operation plate 40a allowing the restraint ring 20 to operate in a direction of reducing the diameter. The restraint ring 20 has a basic structure similar to that of the first embodiment.

The support plate 30a is formed to have the approximately the same diameter as that of the operation plate 40a. An inner peripheral portion of the support plate 30a is one step higher than an outer peripheral portion. The support plate 30a has support surfaces 31 at the one-step higher inner peripheral part, and the plurality of pieces 20a, 20b, 20c, 20d, 20e and 20f divided in the circumferential direction of the restraint ring 20 are supported by the support surfaces 31. The support plate 30a also has a contact portion 35 corresponding to the cylindrical portion 56 of the base plate 54 on a lower surface of the outer peripheral portion (arrow A7 direction in FIG. 8).

The operation plate 40a is provided on the outer periphery of inner peripheral portions of the restraint ring 20 and the support plate 30a. The operation plate 40a is provided so that the main body portion 41 surrounds the outer periphery of the restraint ring 20 and the inner peripheral portion of the support plate 30a. The operation plate 40a is provided so that the inner-side portion 42 covers an upper part of the inner peripheral portions of the restraint ring 20 and the support plate 30a. Moreover, the inner-periphery tapered surface 43 of the main body portion 41 in the operation plate 40a abuts on the outer-periphery inclined surfaces 22 of the respective pieces 20a, 20b, 20c, 20d, 20e and 20f of the restraint ring 20.

In the operation plate 40a, an outer periphery of the main body portion 41 is connected to an outer peripheral portion of the support plate 30a facing the main body portion 41 so as to relatively move along the axial direction of the central axis CL. For example, the outer periphery of the main body portion 41 in the operation plate 40a is connected to the outer peripheral portion of the support plate 30a in series by allowing a plurality of connecting stopper pins 46 to pierce through in parallel to the central axis CL so as to move. An upper end of each connecting stopper pin 46 protruding to an upper part of the operation plate 40a and a lower end thereof protruding to a lower part of the support plate 30a have a large diameter, so that the stopper pins 46 function as stoppers for regulating a range of relative movement of the operation plate 40a and the support plate 30a.

<2-3. Restraining Operation of Inner-Ring Restraint Device 2A>

Figure 11:
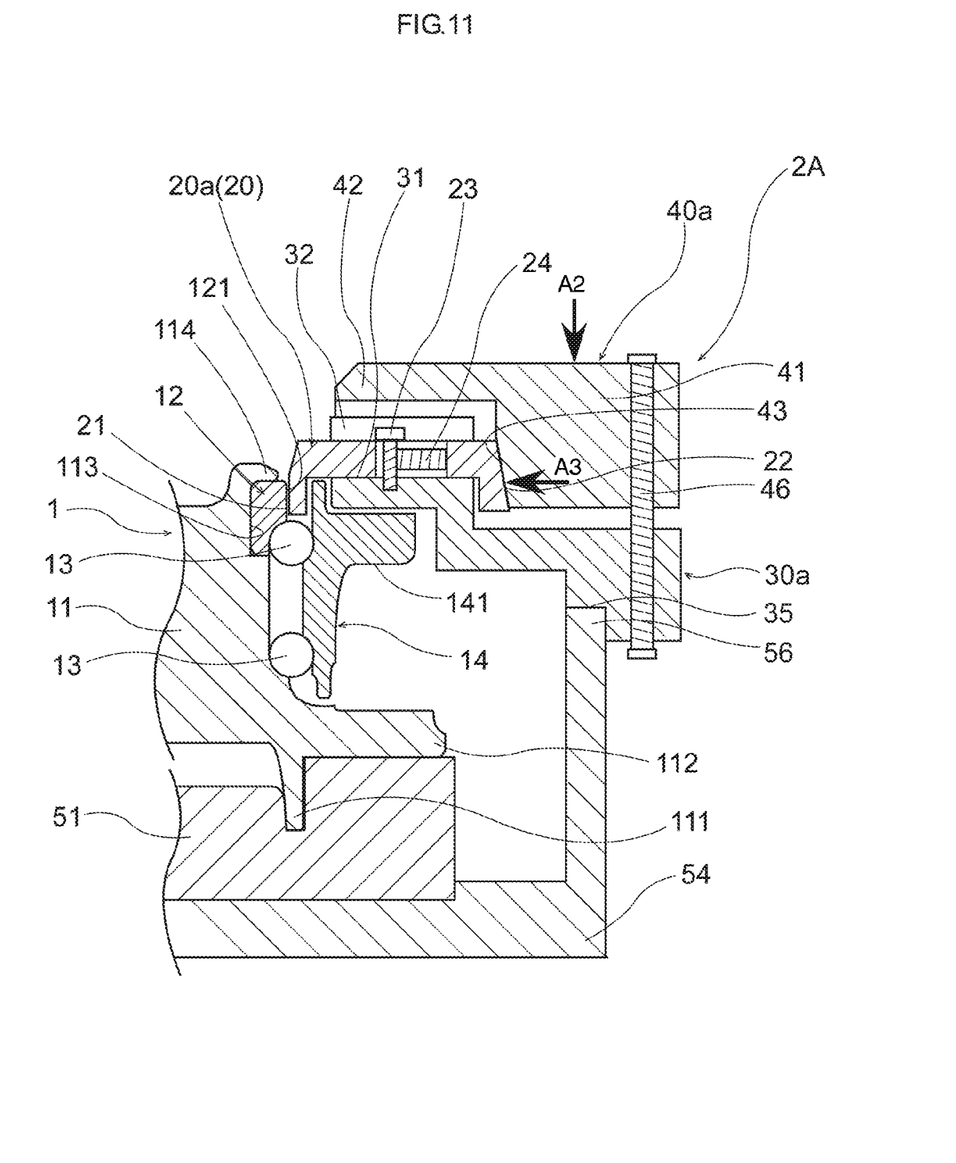
FIG. 11 is a cross-sectional view of a relevant part showing a process of restraining an inner ring of the hub bearing by the inner-ring restraint device corresponding to FIG. 9
Figure 12:
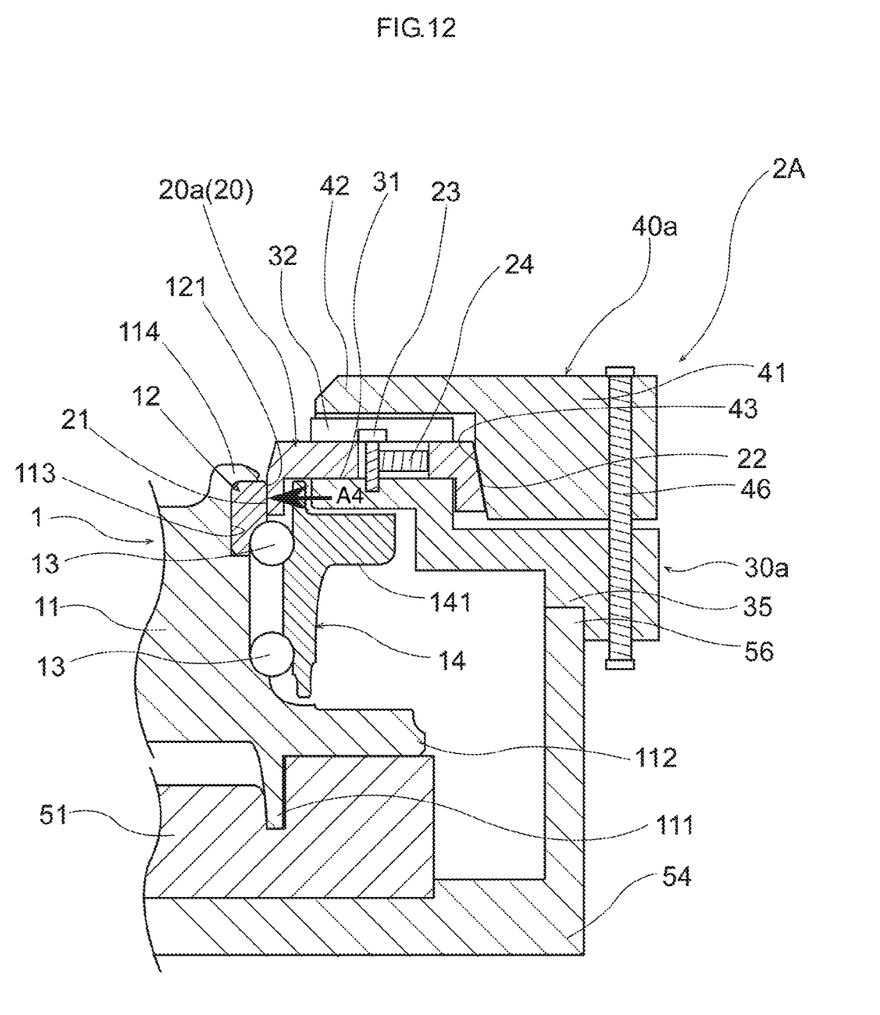
FIG. 12 is a cross-sectional view of a relevant part showing a state where the inner ring is restrained corresponding to FIG. 10.

Referring to FIG. 11 and FIG. 12, a restraining operation of the inner ring 12 of the hub bearing 1 by the inner-ring restraint device 2A will be explained. First, the inner-ring restraint device 2A is lowered toward the hub bearing 1 by the elevating device 60 (FIG. 8). The operation plate 40a of the inner-ring restraint device 2A is pulled down by the elevating device 60, and the restraint ring 20 and the support plate 30a are lowered integrally with the operation plate 40a.

When the inner-ring restraint device 2A is lowered, the contact portion 35 on the lower surface of the outer peripheral portion of the support plate 30a abuts on the cylindrical portion 56 of the base plate 54 as shown in FIG. 11. Accordingly, the lowering of the support plate 30a is regulated. At this time, the abutting portion 21 on the inner periphery of the restraint ring 20 faces the outer peripheral portion 121 of the inner ring 12 of the hub bearing 1.

Even when the lowering of the support plate 30a is regulated, the lowering of the operation plate 40a is continued (arrow A2 direction in FIG. 11). When the operation plate 40a is further lowered, the operation plate 40a is displaced downward with respect to the restraint ring 20 and the support plate 30a, and the inner-side portion 42 moves relatively so as to come close to the support plate 30a along the axial direction. According to the relative movement, the inner-periphery tapered surface 43 of the operation plate 40a pushes the respective pieces 20a, 20b, 20c, 20d, 20e and 20f of the restraint ring 20 supported by the support plate 30a toward the inner side (arrow A3 direction in FIG. 11). Then, the respective pieces 20a, 20b, 20c, 20d, 20e and 20f are displaced inward in the radial direction orthogonal to the central axis CL (see FIG. 8 to FIG. 10) (for example, a displacement amount is approximately 1 to 2 mm), and the restraint ring 20 is reduced in diameter (arrow A1 direction in FIG. 10).

Then, the abutting portion 21 in the inner periphery of the restraint ring 20 with the reduced diameter abuts on the outer peripheral portion 121 of the inner ring 12 of the hub bearing 1 and is pushed thereto as shown in FIG. 12 (arrow A4 direction in FIG. 12). Next, a pressure toward the central axis CL is applied from the inner-periphery tapered surface 43 of the operation plate 40a to the restraint ring 20, and the outer peripheral portion 121 of the inner ring 12 is restrained by the restraint ring 20.

After the inner ring 12 is restrained, the end edge (the caulking portion 114) at the other end of the shaft body 11 of the hub bearing 1 is caulked. After the processing, the inner-ring restraint device 2 is elevated to release the restraint. At this time, the holding tools 85 prevent floating of the hub bearing 1 caused by elevation of the inner-ring restraint device 2 (see FIG. 7).

3. Advantages of Embodiments

In the first embodiment and the second embodiment, the inner-ring restraint devices 2, 2A are devices restricting the inner ring 12 at the time of manufacturing the hub bearing 1 for the vehicle including the shaft body 11, the inner ring 12 provided on the outer periphery of the shaft body 11 and the outer ring 14 provided on the outer periphery of the inner ring so as to rotate freely by the plural rolling elements 13. The inner-ring restraint device 2/2A has the restraint ring 20 allowing the plural pieces 20a, 20b, 20c, 20d, 20e and 20f to be arranged so as to form the ring shape coaxial with the shaft body 11 and restraining the outer peripheral portion 121 of the inner ring 12 by reducing the diameter. The inner-ring restraint device 2/2A has the support plate 30/30a having the ring shape coaxial with the shaft body 11, being provided so as to move along the axial direction of the shaft body 11 and supporting the plural pieces so as to respectively move in the state where the plural pieces 20a, 20b, 20c, 20d, 20e and 20f are arranged in the ring shape so as to reduce and expand the diameter of the restraint ring 20 at the position closer to the hub bearing 1 for the vehicle than the restraint ring 20 in the axial direction. The inner-ring restraint device 2/2A has the ring-shaped operation plate 40/40a arranged on the outer periphery of the restraint ring 20, being connected to the support plate 30/30a so as to relatively move in the axial direction and applying the pressure in the direction of reducing the diameter to the plural pieces 20a, 20b, 20c, 20d, 20e and 20f of the restraint ring 20 respectively by coming relatively close to the support plate 30/30a.

That is, the plural pieces 20a, 20b, 20c, 20d, 20e and 20f of the restraint ring 20 are supported by the support plates 30/30a arranged closer to the hub bearing 1 for the vehicle than the restraint ring 20. Accordingly, at the time of restraining the inner ring 12 of the hub bearing 1 for the vehicle, the plural pieces 20a, 20b, 20c, 20d, 20e and 20f of the restraint ring 20 do not abut on the inner ring 12 and the outer ring 14 of the hub bearing 1 for the vehicle in the axial direction of the hub bearing 1 for the vehicle. Therefore, friction does not occur between the plural pieces 20a, 20b, 20c, 20d, 20e and 20f of the restraint ring 20 and the inner ring 12 or the outer ring 14 of the hub bearing 1 for the vehicle. Consequently, the outer periphery of the inner ring 12 can be restricted efficiently without applying the load in the axial direction to the inner ring 12 and the outer ring 14 of the hub bearing 1 for the vehicle.

In the first embodiment and the second embodiment, the axial direction of the shaft body 11 of the hub bearing 1 for the vehicle is a vertical direction. In the inner-ring restraint device 2/2A, the support plate 30/30a includes the support surfaces 31 abutting on lower surfaces of the pieces 20a, 20b, 20c, 20d, 20e and 20f and supporting the pieces 20a, 20b, 20c, 20d, 20e and 20f so as to move respectively in the direction orthogonal to the axis of the inner ring 12 in at least part of the upper surface.

That is, the support plate 30/30a of the inner-ring restraint device 2/2A supports the respective pieces 20a, 20b, 20c, 20d, 20e and 20f of the restraint ring 20 from the lower side of them by the support surfaces 31, therefore, the support can be efficiently performed with a simple structure.

In the first embodiment and the second embodiment, the inner-ring restraint device 2/2A includes regulating portion 33/56 regulating movement of the support plate 30/30a to the hub bearing 1 side in the axial direction at the position where the inner peripheral portion (abutting portion 21) of the restraint ring 20 faces the outer peripheral portion 121 of the inner ring 12 and the restraint ring 20 restrains the inner ring 12.

That is, the movement of the support plate 30/30a toward the hub bearing 1 for the vehicle in the axial direction is regulated by the regulating portion 33/56 in the inner-ring restraint device 2/2A. Therefore, the respective pieces 20a, 20b, 20c, 20d, 20e and 20f of the restraint ring 20 do not contact the inner ring 12 and the outer ring 14 of the hub bearing 1 in the axial direction.

In the first embodiment, the inner-ring restraint device 2 includes the protruding portion 33 protruding in the cylindrical shape from the support plate 30 in the axial direction and toward the outer ring 14 side to regulate relative movement of the support plate 30 and the end portion of the outer ring 14 in the axial direction over the entire periphery in the circumferential direction of the support plate 30 as the regulating portion 33.

That is, the protruding portion 33 can be formed integrally with the support plate 30 as the regulating portion in the inner-ring restraint device 2, therefore, the structure is simple. Moreover, the protruding portion 33 of the support plate 30 is allowed to abut on the end portion of the outer ring 14 of the hub bearing 1 as the regulating portion in the inner-ring restraint device 2, thereby regulating relative movement of the support plate 30 and the end portion of the outer ring 14 in the axial direction efficiently.

In the second embodiment, the inner-ring restraint device 2A is provided with the cylindrical portion 56 provided in the base plate 54 on which the hub bearing 1 for the vehicle is placed with the cylindrical shape surrounding the hub bearing 1 for the vehicle and regulating relative movement of the support plate 30a and the base plate 54 in the axial direction over the entire periphery in the circumferential direction of the support plate 30a as the regulating portion 56.

That is, the movement of the support plate 30a is regulated by allowing the support plate 30a to abut on the cylindrical portion 56 of the base plate 54 in the inner-ring restraint device 2A. As the movement of the support plate 30a is regulated without contacting the hub bearing 1 in the axial direction at all, the load in the axial direction is not applied to the hub bearing 1.

The present invention is not limited to the above embodiments. For example, the inner ring 12 of the hub bearing 1 is restricted by lowing the inner-ring restraint device 2/2A in the first embodiment and the second embodiment, however, the present invention is not limited to this. A structure in which the inner ring 12 is restricted by elevating the base 50 side supporting the hub bearing 1 may be adopted.

REFERENCE SIGNS LIST

1: hub bearing
11: shaft body
12: inner ring
13: rolling element
14: outer ring
2, 2A: inner-ring restraint device
20: restraint ring
20a, 20b, 20c, 20d, 20e, 20f: piece
30, 30a: support plate
31: support surface
33: protruding portion (regulating portion)
40, 40a: operation plate
54: base plate
56: cylindrical portion (regulating portion)

The invention claimed is:

1. An inner-ring restraint device of a hub bearing for a vehicle that restricts an inner ring at the time of manufacturing the hub bearing for the vehicle including a shaft body, the inner ring provided on an outer periphery of the shaft body and an outer ring provided on an outer periphery of the inner ring so as to rotate freely by a plurality of rolling elements, comprising:
   a restraint ring having in a first ring shape formed by a plurality of pieces to be arranged to form the first ring shape coaxial with the shaft body, the restraint ring restricting an outer peripheral portion of the inner ring of the hub bearing by reducing a diameter, and each of the plurality of pieces has an arc-shaped portion that restricts the outer peripheral portion of the inner ring of the hub bearing;
   a support plate having a second ring shape coaxial with the shaft body, being provided so as to move along an axial direction of the shaft body and supporting the plurality pieces so as to respectively move in a state where the plural pieces are arranged in the first ring shape so as to reduce and expand the diameter of the restraint ring at a position closer to the hub bearing for the vehicle than the restraint ring in the axial direction; and
   a ring-shaped operation plate arranged on an outer periphery of the restraint ring, being connected to the support plate so as to relatively move in the axial direction and applying a pressure in a direction of reducing the diameter to the plural pieces of the restraint ring respectively by coming relatively close to the support plate.

2. The inner-ring restraint device of the hub bearing for the vehicle according to claim 1,
   wherein the axial direction is a vertical direction, and
   the support surface includes support surfaces abutting on lower surfaces of the pieces and supporting the pieces so as to move respectively in a direction orthogonal to an axis of the inner ring in at least part of an upper surface.

3. The inner-ring restraint device of the hub bearing for the vehicle according to claim 1, further comprising:
   a regulating portion regulating movement of the support plate to the hub bearing for the vehicle in the axial direction at a position where an inner peripheral portion of the restraint ring faces the outer peripheral portion of the inner ring and the restraint ring restrains the inner ring.

4. The inner-ring restraint device of the hub bearing for the vehicle according to claim 3,
   wherein the regulating portion includes a protruding portion protruding in a cylindrical shape from the support plate in the axial direction and toward the outer ring to regulate relative movement of the support plate and an end portion of the outer ring in the axial direction over the entire periphery in a circumferential direction of the support plate.

5. The inner-ring restraint device of the hub bearing for the vehicle according to claim 3,
   wherein the regulating portion includes a cylindrical portion provided in a base plate on which the hub bearing for the vehicle is placed with a cylindrical shape surrounding the hub bearing for the vehicle and regulating relative movement of the support plate and the base plate in the axial direction over the entire periphery in the circumferential direction of the support plate at the time of manufacture.

\* \* \* \* \*